(12) United States Patent
Hideo et al.

(10) Patent No.: US 6,944,380 B1
(45) Date of Patent: Sep. 13, 2005

(54) OPTICAL FIBER FOR TRANSMITTING ULTRAVIOLET RAY, OPTICAL FIBER PROBE, AND METHOD OF MANUFACTURING THE OPTICAL FIBER PROBE

(75) Inventors: Hosono Hideo, Yamato (JP); Hirano Masahiro, Tokyo (JP); Oto Masanori, Kawasaki (JP); Tochitani Gen, Kawasaki (JP); Ohneda Susumu, Kawasaki (JP); Kikugawa Shinnya, Yokohama (JP)

(73) Assignee: Japan Science and Technology Agency, (JP)

( * ) Notice: Subject to any disclaimer, the term of this patent is extended or adjusted under 35 U.S.C. 154(b) by 198 days.

(21) Appl. No.: 10/399,967

(22) PCT Filed: Jan. 11, 2002

(86) PCT No.: PCT/JP02/00123

§ 371 (c)(1),
(2), (4) Date: Apr. 23, 2003

(87) PCT Pub. No.: WO02/056070

PCT Pub. Date: Jul. 18, 2002

(30) Foreign Application Priority Data

Jan. 16, 2001 (JP) .............................. 2001-007111
Aug. 20, 2001 (JP) .............................. 2001-248684

(51) Int. Cl.$^7$ .............................. G02B 6/02; G02B 1/00

(52) U.S. Cl. ...................... 385/123; 385/129; 385/128; 385/141; 385/143; 385/145; 427/163.1

(58) Field of Search .............................. 385/123, 124, 385/126, 127, 128, 141, 142, 143, 144; 427/163.1

(56) References Cited

U.S. PATENT DOCUMENTS

| 4,504,114 A | * | 3/1985 | Arrington | .................... 385/142 |
| 5,335,306 A | | 8/1994 | Takita et al. | ................. 385/142 |
| 5,405,481 A | | 4/1995 | Licoppe et al. | ............. 156/345 |

(Continued)

FOREIGN PATENT DOCUMENTS

JP    1-126602    5/1989    ............. 385/123 X (Continued)

*Primary Examiner*—Brian M. Healy
(74) *Attorney, Agent, or Firm*—Lorusso & Loud

(57) ABSTRACT

It is an object of the present invention to provide an optical fiber for transmitting ultraviolet ray which has an improve transmittance and is prevented from deterioration by ultraviolet ray with which it is irradiated. It is another object of the present invention to provide an optical fiber probe which can propagate vacuum ultraviolet ray and deep ultraviolet ray at a high transmittance, is deteriorated only to a limited extent when irradiated with ultraviolet ray and can be etched to have a desired shape of the sharpened section at the fiber end.

The present invention provides the optical fiber for transmitting ultraviolet ray which has a core 5 of silica glass containing a given content of fluorine and a clad 6a of silica glass containing a given content of fluorine or boron, a clad 6b of a resin which transmits ultraviolet ray or a clad 6c having air holes H. The clad may be coated with a protective layer and further with a covered layer for protection. In particular, the core, clad and protective layer have a high transmittance for ultraviolet ray and resistance to ultraviolet ray with which they are irradiated, when treated with hydrogen.

An optical fiber probe 1 has an optical fiber 2 provided with a sharpened section 3 at the end, which is sharpened with an etchant solution, the sharpened section 3 being coated with a light-shielding metallic film 4.

18 Claims, 10 Drawing Sheets

U.S. PATENT DOCUMENTS

| | | | | |
|---|---|---|---|---|
| 5,621,843 A | * | 4/1997 | Neuberger | 385/123 |
| 5,802,236 A | | 9/1998 | DiGiovanni et al. | 385/127 |
| 5,960,147 A | | 9/1999 | Muramatsu et al. | 385/123 |
| 5,983,673 A | | 11/1999 | Urano et al. | 65/30.1 |
| 6,130,981 A | * | 10/2000 | Nelson et al. | 385/128 |
| 6,220,059 B1 | | 4/2001 | Klein et al. | 65/394 |

FOREIGN PATENT DOCUMENTS

| | | | |
|---|---|---|---|
| JP | 11-271337 | 10/1999 | 385/123 X |

* cited by examiner

OPTICAL FIBER FOR TRANSMITTING ULTRAVIOLET RAY, OPTICAL FIBER PROBE, AND METHOD OF MANUFACTURING THE OPTICAL FIBER PROBE

CROSS-REFERENCE TO RELATED APPLICATION

This application is a National Phase Application (35 USC 371) of PCT/JP02/00123 and claims priority of Japanese Application No. 2001-7111 filed Jan. 16, 2001 and Japanese Application No. 2001-248684 filed Aug., 2001.

TECHNICAL FIELD

This invention relates to optical fiber for transmitting ultraviolet ray, optical fiber probe, and methods of producing the same, more particularly the optical fiber for transmitting ultraviolet ray capable of transmitting the ray having a wavelength of 300 nm or less, optical fiber probe suitable as the one for scanning near field optical microscopes (SN-OMs), and methods of producing the optical fiber for transmitting ultraviolet ray and optical fiber probe.

BACKGROUND OF THE INVENTION

Optical fibers have been used for information transmission or the like, and medical equipment and semiconductor production lines, e.g., for excimer laser used for lithography for semiconductor production lines.

An optical fiber is made of silica glass or the like, with the core of high refractive index covered with clad of low refractive index, the former being doped with germanium, phosphorus or the like to increase refractive index while the latter with boron, fluorine or the like to decrease refractive index.

On the other hand, an excimer laser, e.g., ArF or KrF laser, emits high-energy ultraviolet ray of 193 or 248 nm. The high-energy ultraviolet ray, so-called deep ultraviolet ray of 200 to 300 nm and so-called vacuum ultraviolet ray of 200 nm or less cannot be transmitted, because they are absorbed by $H_2O$ or $O_2$ while traveling in air, and greatly lost. Therefore, the exposure device equipped with an excimer laser tends to be large-sized due to necessity for providing the light path kept vacuum or filled with an inert gas. Application of optical fiber has been in demand to reduce size of the exposure device equipped with an excimer laser, because it allows the exposure device to be handled more simply.

Those devices which utilize deep ultraviolet or vacuum ultraviolet ray include excimer lamps, e.g., $Xe_2$, KrCl and XeCl lamps which emit deep or vacuum ultraviolet ray of 172, 222 and 308 nm. These excimer lamps are used for surface cleaning devices by which contaminants attaching to semiconductor wafer and liquid-crystal display glass surfaces are optically decomposed by ultraviolet ray to be removed. Application of optical fiber has been also in demand by these surface cleaning devices equipped with an excimer lamp to reduce their size and facilitate their handling, as is the case with the exposure devices. Transmittance of an optical fiber changes with wavelength of the deep or vacuum ultraviolet ray to be transmitted, as shown in FIG. 13.

However, the conventional optical fiber is deteriorated when irradiated with ultraviolet ray. Referring to FIG. 14, deterioration of the optical fiber by the transmission of ultraviolet ray is represented by the phenomenon of decreased transmittance T6 with time, when a 1 m long silica glass having a core of 200 μm in diameter is irradiated with light emitted from a deuterium lamp (wavelength: 214 nm). Therefore, an optical fiber is treated with hydrogen to prevent deterioration of the transmission characteristics. Nevertheless, deterioration represented by that of transmittance T5 is unavoidable. Therefore, the conventional optical fiber is inapplicable to transmission of ultraviolet ray, because of its rapid deterioration by the transmission of ultraviolet ray.

On the other hand, recently, the so-called scanning near field optical microscope has been developed to detect near field light. It has been used for, e.g., observation or destruction of cells, DNAs and other very small objects.

The sample to be observed by this type of microscope is placed on a total reflection prism of inverted triangle shape, where the sample is irradiated with light from the back side under the conditions to satisfy the total reflection at the sample surface. This generates the surface wave referred to as near field light in the vicinity of the sample surface. When a probe with sharpened end, or sharpened probe, is inserted in the surface wave, the near field light is scattered, and part of the scattered light penetrates into the probe and is guided to the detection member, to measure optical information from the sample at a resolution of the order of nanometer.

The probe for a scanning near field microscope working on the above principle has been an optical fiber probe, with core of silica glass containing a given quantity of germanium, covered with a clad of silica glass.

However, the optical fiber probe of the above structure is difficult to propagate the so-called vacuum ultraviolet ray having a wavelength of 200 nm or less and so-called deep ultraviolet ray having a wavelength of 200 to 300 nm, which is one of its major disadvantages, because it is greatly deteriorated by the transmission of the vacuum or deep ultraviolet ray and is not fit for such ray.

Incidentally, for an optical fiber to be used for the probe for a scanning near field optical microscope, it is necessary to sharpen its end to a light wavelength or less. Its end can be sharpened by immersing it in an etchant solution, as disclosed by, for example, Japanese Patent Laid-open No. 104244/1998. How fast it is dissolved in the etchant solution depends on the etchant solution composition and material of each layer that constitutes the optical fiber.

However, the conventional etching method has a disadvantage that it cannot efficiently etch the optical fiber, because it is composed of the core of silica glass covered with clad, and is difficult to have a desired shape of the sharpened section at the fiber end.

The present invention is developed to solve these problems. It is the first object of the invention to provide an optical fiber for transmitting ultraviolet ray which has a high transmittance for deep ultraviolet ray, vacuum ultraviolet ray or the like, and is deteriorated only to a limited extent when irradiated with ultraviolet ray, and method of producing the same. It is the second object of the invention to provide an optical fiber probe which can propagate vacuum ultraviolet ray and deep ultraviolet ray at a high transmittance, is deteriorated only to a limited extent when irradiated with ultraviolet ray and can be etched to have a desired shape of the sharpened section at the optical fiber end, and method of producing the same.

DISCLOSURE OF THE INVENTION

The optical fiber of the present invention for transmitting ultraviolet ray has the core of silica glass containing fluorine at 100 to 1,000 ppm, to achieve the first object.

Further, the optical fiber of the present invention for transmitting ultraviolet ray also has the clad of silica glass containing fluorine at 1,000 to 7,000 ppm or boron at 2,000 to 10,000 ppm.

Moreover, the optical fiber of the present invention for transmitting ultraviolet ray has the clad of resin which transmits ultraviolet ray.

Further, the optical fiber of the present invention for transmitting ultraviolet ray has the clad with two or more air holes arranged in parallel to the optical axis.

The optical fiber of the present invention for transmitting ultraviolet ray has the clad coated with a covered layer for protection.

The optical fiber of the present invention for transmitting ultraviolet ray has a high transmittance for ultraviolet ray and is resistant to deterioration by ultraviolet ray when irradiated therewith, because it has the core of silica glass containing a given content of fluorine, and clad of silica glass containing a given content of fluorine or boron, of resin which transmits ultraviolet ray, or with two or more air holes arranged in parallel to the optical axis. Therefore, it can be suitably used for, e.g., an excimer laser and excimer lamp which use ultraviolet ray, and can reduce size of the exposure device which uses the excimer laser, and surface cleaning device which uses the excimer lamp.

The method of the present invention for producing the optical fiber for transmitting ultraviolet ray impregnates with hydrogen the optical fiber which has the core of silica glass containing fluorine at 100 to 1,000 ppm, after it is drawn.

Further, the method of the present invention for producing the optical fiber for transmitting ultraviolet ray impregnates with hydrogen the optical fiber having the core coated with capillaries each having an air hole at the center, after the core is integrated with the capillaries arranged thereon and drawn.

Moreover, the method of the present invention for producing the optical fiber for transmitting ultraviolet ray coats the clad with the covered layer for protection during the drawing step.

Besides, the method of the present invention for producing the optical fiber for transmitting ultraviolet ray forms the covered layer for protection, after the fiber is impregnated with hydrogen.

The method of the present invention for producing the optical fiber for transmitting ultraviolet ray impregnates the fiber with hydrogen after the drawing step to enhance the effect of preventing its deterioration in particular when it is irradiated with ultraviolet ray, giving the optical fiber applicable to transmission of deep and vacuum ultraviolet ray.

The optical fiber probe of the present invention has the optical fiber sharpened at the end, wherein the fiber has the core of silica glass containing fluorine at 100 to 1,000 ppm, to achieve the second object.

Further, the optical fiber for the optical fiber probe of the present invention has the core coated with the clad of silica glass containing fluorine at 1,000 to 7,000 ppm or boron at 2,000 to 10,000 ppm.

Moreover, the optical fiber for the optical fiber probe of the present invention has the core coated with the clad of resin which transmits ultraviolet ray.

The optical fiber for the optical fiber probe of the present invention has the core coated with the clad with two or more air holes arranged in parallel to the optical axis.

The optical fiber for the optical fiber probe of the present invention has the clad covered with a protective layer.

Moreover, the optical fiber for the optical fiber probe of the present invention has the protective layer which is further coated with the covered layer for protection.

The optical fiber probe of the present invention can transmit deep ultraviolet and vacuum ultraviolet ray at a high transmittance, is resistant to deterioration by deep ultraviolet and vacuum ultraviolet ray when irradiated therewith, and stably serviceable for extended periods, because its optical fiber has, e.g., the core of silica glass containing a given content of fluorine and clad of silica glass containing a given content of fluorine over the core.

The method of the present invention for producing the optical fiber probe sharpens the optical fiber end with an etchant solution.

Further, the etchant solution for the method of the present invention for producing the optical fiber probe is a 2 to 46% aqueous solution of hydrofluoric acid.

The optical fiber can be etched more efficiently by the method of the present invention for producing the optical fiber probe than the conventional one provided with the core of germanium-containing silica glass, because it has the fluorine-containing core and clad, and etched with an aqueous solution of hydrofluoric acid as the etchant solution. Therefore, the method of the present invention for producing the optical fiber probe can sharpen the optical fiber end to a desired shape.

BEST MODES FOR CARRYING OUT THE INVENTION

The preferred embodiments of the present invention for the optical fiber for transmitting ultraviolet ray, optical fiber probe, and methods of producing the same are described below by referring to the attached drawings.

Figure 1:
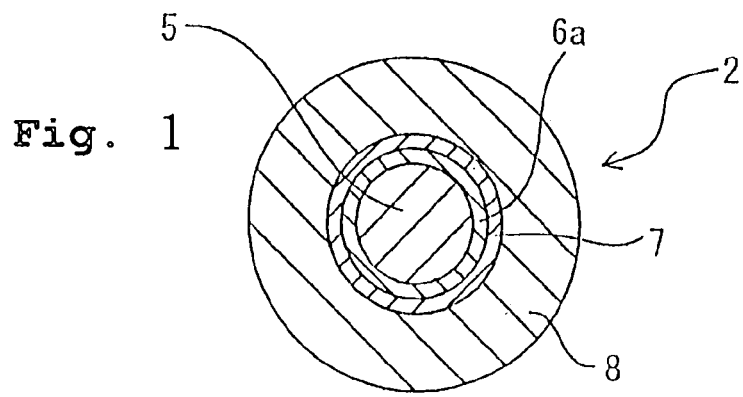
FIG. 1 is a cross-sectional view of the optical cable for transmitting ultraviolet ray as one of the embodiments of the present invention.
Figure 2:
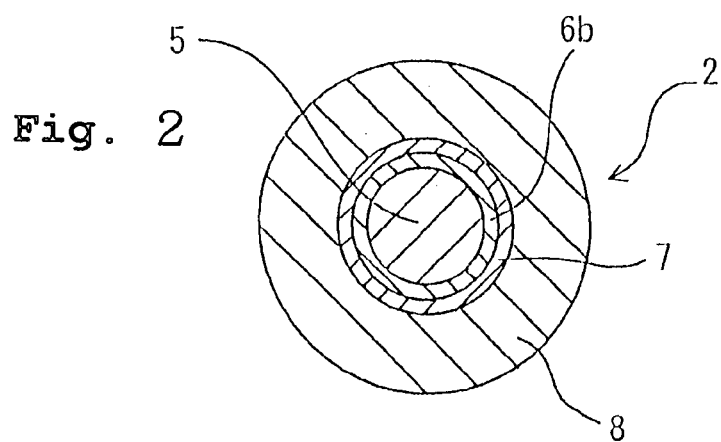
FIG. 2 is a cross-sectional view of the optical cable for transmitting ultraviolet ray as another embodiment of the present invention.
Figure 3:
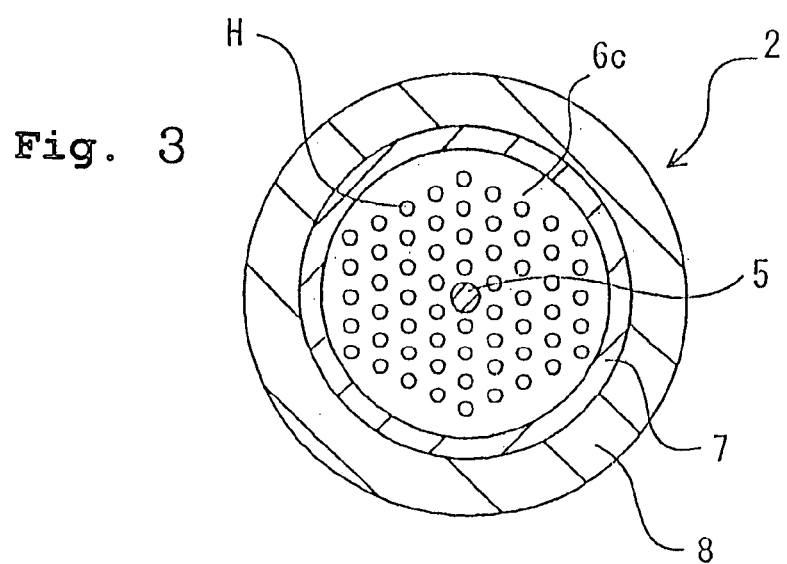
FIG. 3 is a cross-sectional view of the optical cable for transmitting ultraviolet ray as still another embodiment of the present invention.

FIG. 1 is a cross-sectional view of the optical cable for transmitting ultraviolet ray as one of the embodiments of the present invention. FIGS. 2 and 3 are the cross-sectional views of the optical cables for transmitting ultraviolet ray as other embodiments of the present invention, where the sections common to those shown in FIG. 1 are marked with the same symbols.

Referring to FIG. 1, an optical cable 2 of the present invention for transmitting ultraviolet ray has a core 5 and a clad 6a over the core 5, and the clad 6a is coated with a protective layer 7 and a covered layer for protection 8, as required.

The core 5 is made of silica glass containing fluorine at 100 to 1,000 ppm. Fluorine has been incorporated in the clad to reduce its refractive index. In the optical cable of the present invention for transmitting ultraviolet ray, on the other hand, fluorine is incorporated at 100 to 1,000 ppm in the silica glass which constitutes the core 5, to impart a high transmittance to the optical fiber for ultraviolet ray. The fluorine content in the silica glass is set at a level in the above range, because transmittance of the optical fiber containing fluorine at below 100 ppm is insufficient for ultraviolet ray, and the upper limit content of 1,000 ppm comes from the consideration of fluorine content in the clad, described later. The silica glass containing fluorine at 100 to 1,000 ppm preferably contains OH group at 4 to 7 ppm to prevent deterioration of the optical fiber when it is irradiated with ultraviolet ray. The content below 4 ppm is insufficient to prevent decrease of the transmittance of the optical fiber for ultraviolet ray, and above 7 ppm will conversely deteriorate the transmittance.

The clad 6a is made of silica glass containing fluorine at 1,000 to 7,000 ppm or boron at 2,000 to 10,000 ppm. Fluorine or boron incorporated in the silica glass at a given content can prevent deterioration of transmittance of the optical fiber for light to be transmitted. The lower limit of the fluorine content of 1,000 ppm in the silica glass comes from consideration of the fluorine content in the core 5, whereas the upper limit of 7,000 ppm comes from saturation of the silica glass with fluorine.

On the other hand, the lower limit of the boron content in the silica glass is set at 2,000 ppm, because it is difficult to prevent deterioration of transmittance of the optical fiber for light to be trasmitted at below 2,000 ppm in consideration of refractive index of the core 5. On the other hand, the upper limit of 10,000 ppm comes from saturation of the silica glass with boron.

In the above embodiment, the core 5 is coated with the clad 6a of silica glass containing fluorine or boron at a given content. However, the clad 6a may be replaced by a clad 6b of a resin which transmits ultraviolet ray, as shown in FIG. 2. Such a resin is preferably a fluorine-based one, more preferably non-crystalline fluorine resin, viewed from light transmission. A crystalline fluorine resin tends to lose transmittance by light scattering, and, when used for the clad 6b, preferably has a degree of crystallinity of 30% or less. In the case of non-crystalline resin, its degree of crystallinity is preferably 20% or less. These fluorine resins particularly suitable for the present invention include fluorine polymer having an alicyclic structure in the main chain, e.g., amorphous perfluoro resin (a trade name: CYTOP (made by Asahi Glass Company).

The clad 6a over the core 5 may be also replaced by a clad 6c having a number of air holes H, as shown in FIG. 3. These air holes H are arranged in parallel to the optical axis of the optical fiber, in such a way that their total area accounts for around 10 to 60% of the optical fiber cross-section. They are arranged uniformly over the clad 6c cross-section.

In the above embodiment, refractive index of the core 5 can be reduced to the optimum level for light transmission by the presence of air in the air holes H.

Diameter of the clad 6a, 6b or 6c is set at 200 $\mu$m for the core 5 of 150 $\mu$m in diameter, and at 1000 $\mu$m for the core 5 of 800 $\mu$m in diameter.

The protective layer 7 is provided for protecting the optical fiber mechanically and from the environment. It is made of, e.g., silicone, polyimide, urethane-based or acrylate-based resin. It is provided at a thickness of 100 to 250 $\mu$m, because it may not sufficiently protect the core 5 and clad 6a, 6b or 6c at a thickness below 100 $\mu$m.

The covered layer for protection 8 is provided to reinforce the optical fiber. The suitable material therefor is a nylon resin. It is provided at a thickness of 400 to 600 $\mu$m, because it may not sufficiently reinforce the optical fiber at a thickness below 400 $\mu$m.

Next, the method of producing the optical fiber of the above structure for transmitting ultraviolet ray is described below.

(1) Preparation of the Core 5

The core can be prepared by, e.g., the direct vitrification in which silica glass with a given quantity of $SiO_2$ particles accumulated thereon is treated by the flame hydrolysis, or the so-called soot method which involves a separate sintering step.

(2) Production of the Optical Fiber for Transmitting Ultraviolet Ray, with the Clad of Silica Glass Containing a Given Content of Fluorine or Boron The optical fiber for transmitting ultraviolet ray, with the clad of silica glass containing a given content of fluorine or boron, can be produced by, e.g., the vapor-phase axial deposition (VAD), outside vapor deposition (OVD) or modified chemical vapor deposition (MCVD) method. The preform can be prepared by forming silica glass containing a given content of fluorine or boron into a hollow doping tube of around 30 mm in outer diameter and inserting the core rod prepared beforehand into the tube. The preform is drawn into the optical fiber for transmitting ultraviolet ray.

Figure 4:
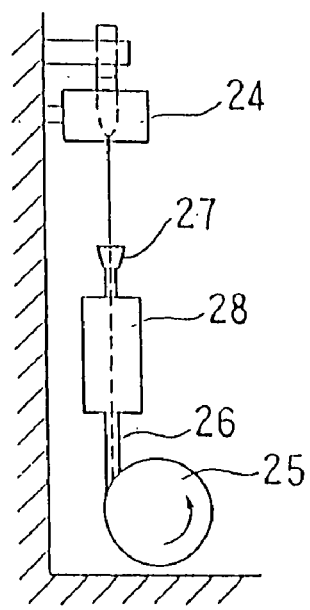
FIG. 4 shows the process describing the method of producing optical fiber for transmitting ultraviolet ray as one of the embodiments of the present invention.

The preform can be drawn by the apparatus shown in FIG. 4, where the preform is fused under heating in a furnace 24, and wound by a winding machine 25 at a rate to give a given diameter. For forming a protective layer 26, a given quantity of the resin for the protective layer 26 is extruded onto the clad surface by a die 27 downstream of the furnace 24, crosslinked under heating by a crosslinking apparatus 28 in the case of silicone or polyimide resin or with the aid of ultraviolet ray with which it is irradiated in the case of urethane- or acrylate-based resin, and solidified or treated to remove the solution, to form the protective layer.

Figure 5:
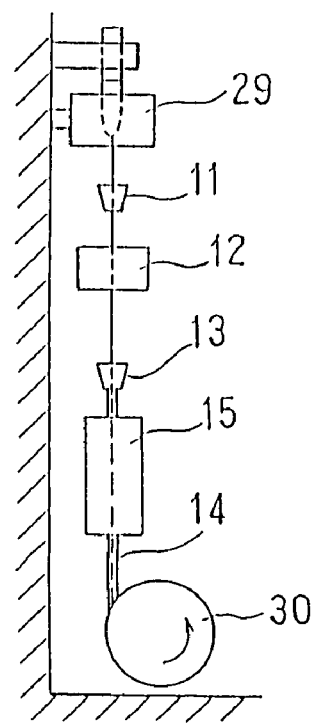
FIG. 5 shows the process describing the method of producing optical fiber for transmitting ultraviolet ray as another embodiment of the present invention.

(3) Production of the Optical Fiber for Transmitting Ultraviolet Ray, with the Clad of Resin which Transmits Ultraviolet Ray The optical fiber for transmitting ultraviolet ray can be produced by the following manner. The core rod, prepared in the above-described manner, is drawn by the apparatus shown in FIG. 5, where it is fused under heating in a furnace 29, and wound by a winding machine 30 at a rate to give a given diameter, and the resin which transmits ultraviolet ray is extruded by a die 11 and crosslinked with the aid of ultraviolet ray by a crosslinking apparatus 12. A protective layer 14 is formed in the same manner as in the above method (2), where a given quantity of the resin for the protective layer 14 is extruded onto the surface of the resin which transmits ultraviolet ray from a die 13, and crosslinked under heating by a crosslinking apparatus 15 or with the aid of ultraviolet ray with which it is irradiated.

Figure 6:
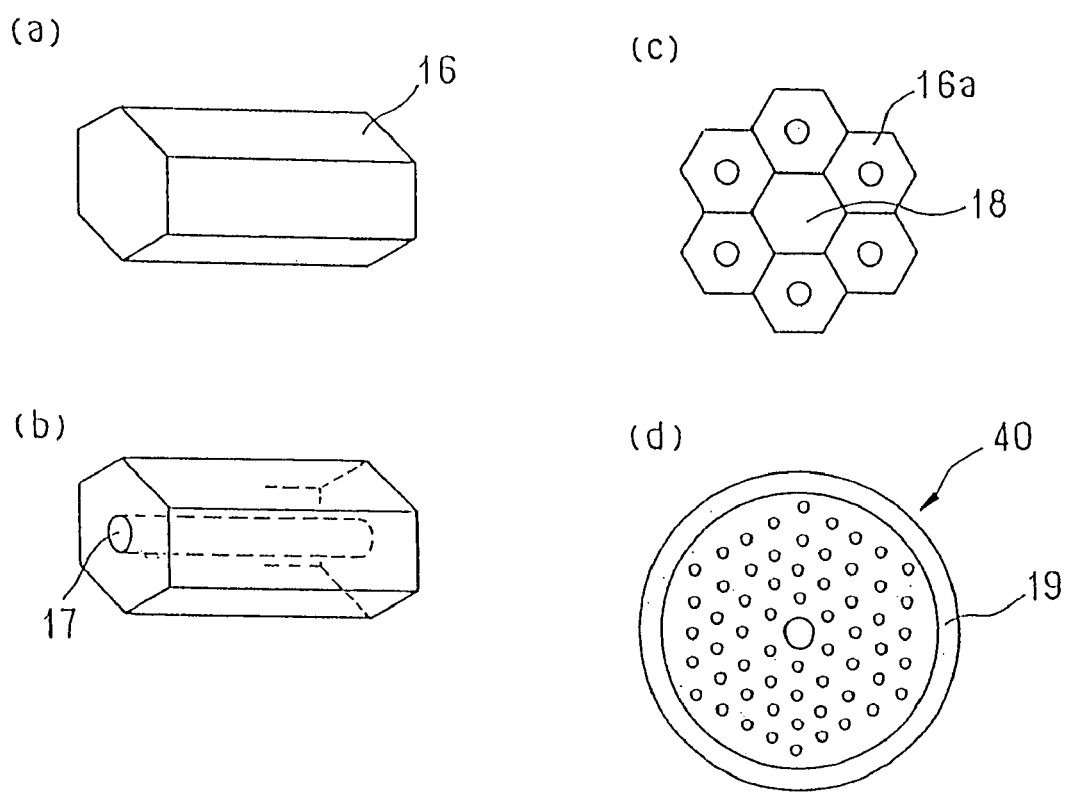
FIG. 6 shows the process describing the method of producing optical fiber for transmitting ultraviolet ray as still another embodiment of the present invention.

(4) Production of the Optical Fiber for Transmitting Ultraviolet Ray, with the Clad having Air Holes Referring to FIG. 6, a silica rod 16 (FIG. 6a) having a diameter of around 30 mm is prepared by, e.g., the direct vitrification in which silica glass with a given quantity of $SiO_2$ particles accumulated thereon is treated by the flame hydrolysis, or the so-called soot method which involves a separate sintering step, in a manner similar to that for producing the core. The silica rod 16 may be of silica glass similar to that used for the core. It is not necessarily hexagonal and may be cylindrical. It is bored to have a hole 17 at the center (FIG. 6b). The silica rod 16 having the hole 17 is drawn to a diameter of around 1 mm, and a core rod 18 serving as the core is inserted into the center of the drawn silica rods 16a (FIG. 6c). The silica rods with the core rod 18 are covered with a silica pipe 19, to form a preform 40 having a diameter of around 30 mm (FIG. 6d). Then, the preform 40 is drawn to have the optical fiber for transmitting ultraviolet ray having a given diameter. The protective layer can be formed in the same manner as described above.

(5) Hydrogen Treatment

The drawing step is followed by the hydrogen treatment step, which is effected to prevent deterioration of the optical fiber by ultraviolet ray with which it is irradiated. The hydrogen treatment may be effected by impregnation, where the optical fiber is left in hydrogen kept at a pressure of 0.5 to 15 MPa and temperature of 20 to 100° C. It may be treated for a long time, e.g., 50 hours or more. The treatment for 50 hours makes the optical fiber effectively resistant to ultraviolet ray. The treatment for less than 2 hours may not bring about the sufficient effect of preventing the deterioration.

(6) Preparation of the Covered Layer for Protection

Moreover, the hydrogen-impregnated optical fiber is coated with the covered layer for protection, which is made of nylon resin or the like, extruded from a die onto the optical fiber surface and cooled.

The optical fiber is finally treated at the terminals to produce the final product. For the terminal treatment, the terminal surface may be ground, as required, before the fiber is connected to a connector or the like.

EXAMPLE 1

A fluorine-doped silica glass (a trade name: AOX made by Asahi Glass Company) containing fluorine at 100 to 200 ppm and OH group at 4 to 7 ppm was used for the core, and silica glass containing fluorine at 2,000 ppm was used for the clad. The core and clad were produced to have a diameter of 600 and 750 μm, respectively. The optical fiber was treated with hydrogen, and irradiated with ultraviolet ray of varying wavelength emitted from an ArF excimer, to measure its transmittance at each wavelength before and after it was irradiated with ultraviolet ray running the unit length (1 m) of the fiber.

Figure 7:
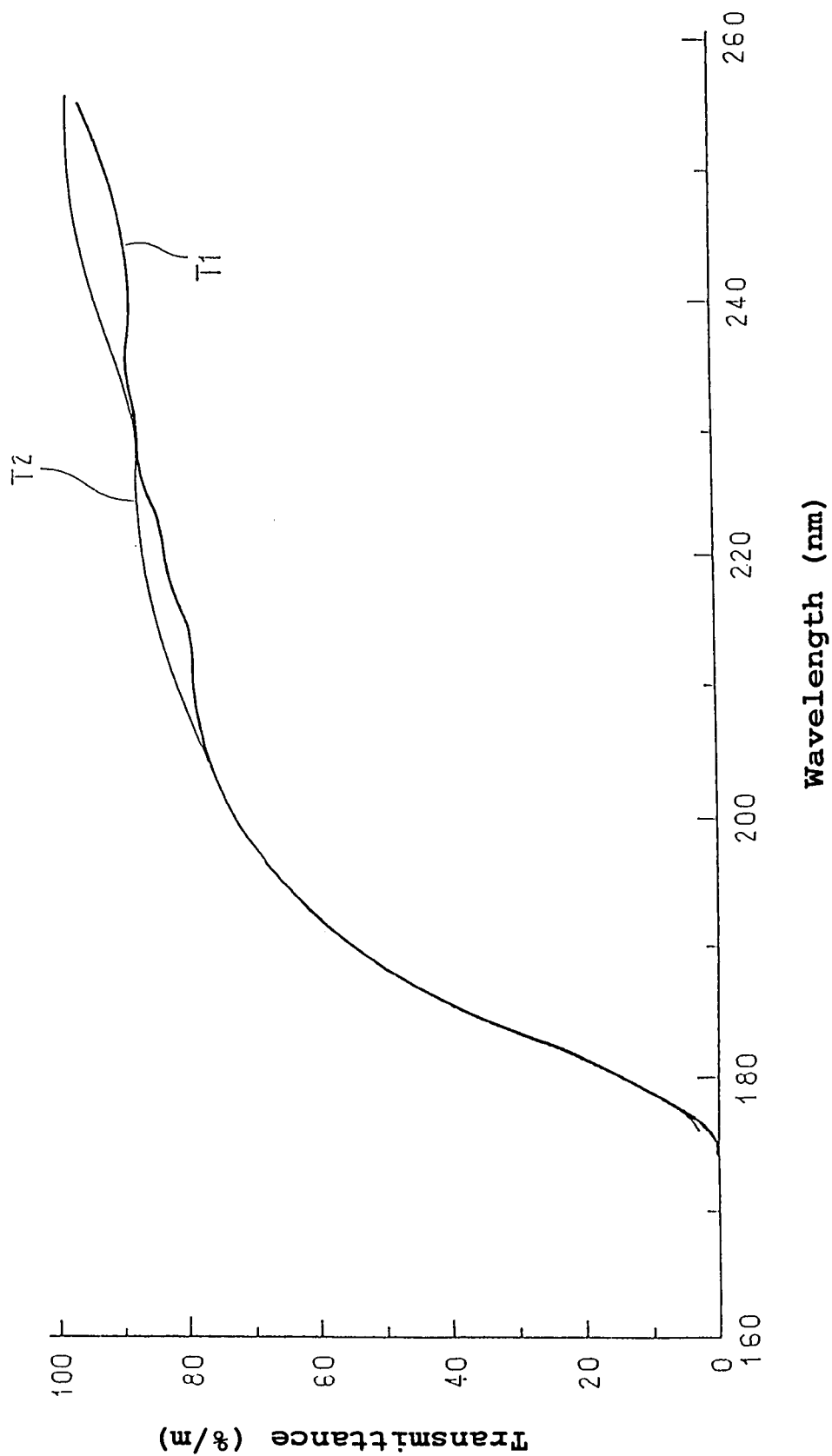
FIG. 7 is a graph explaining the characteristics of the optical fiber of the present invention for transmitting ultraviolet ray.

FIG. 7 shows the measurement results. As shown, the transmittance of the optical fiber remained essentially the same before and after it was irradiated with ultraviolet ray, T1 versus T2, indicating that the optical fiber for transmitting ultraviolet ray showed little deterioration even when it was irradiated with ultraviolet ray.

Figure 8:
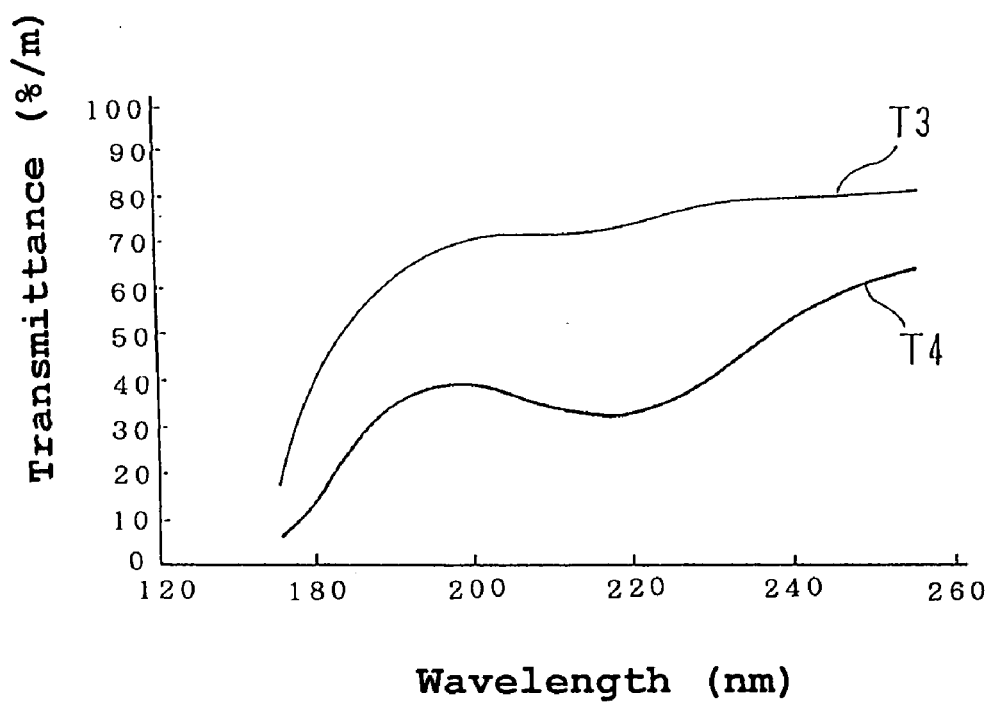
FIG. 8 is another graph explaining the characteristics of the optical fiber of the present invention for transmitting ultraviolet ray.

The optical fiber not treated with hydrogen was also irradiated with ultraviolet ray of varying wavelength emitted from an ArF excimer, to measure its transmittance at each wavelength before and after it was irradiated with ultraviolet ray running the unit length (1 m) of the fiber. FIG. 8 shows the measurement results. As shown, the transmittance of the optical fiber decreased when it was irradiated with ultraviolet ray, from T3 to T4, indicating that the hydrogen treatment can control deterioration of the optical fiber by ultraviolet ray.

Incidentally, the ArF excimer laser emitted ultraviolet ray under the conditions of light density: 20 $mJ/cm^2$/pulse, repetition frequency: 20 Hz, and pulse number: 6000. Transmittance of the optical fiber for transmitting ultraviolet ray was measured for each wavelength of ultraviolet ray before and after it was repeatedly irradiated with the ray of varying wavelength running the unit length (1 m) of the fiber.

As described above, the optical fiber of the present invention for transmitting ultraviolet ray can have an improved transmittance for ultraviolet ray and resistance to deterioration by ultraviolet ray when it is irradiated therewith, and reduce the effects of deterioration. It is particularly noted that the hydrogen-treated optical fiber has greatly improved characteristics, showing no deteriorated transmittance when irradiated with ultraviolet ray.

Next, the preferred embodiment of the optical fiber probe of the present invention and methods of producing the same is described by referring to the attached drawings.

Figure 9:
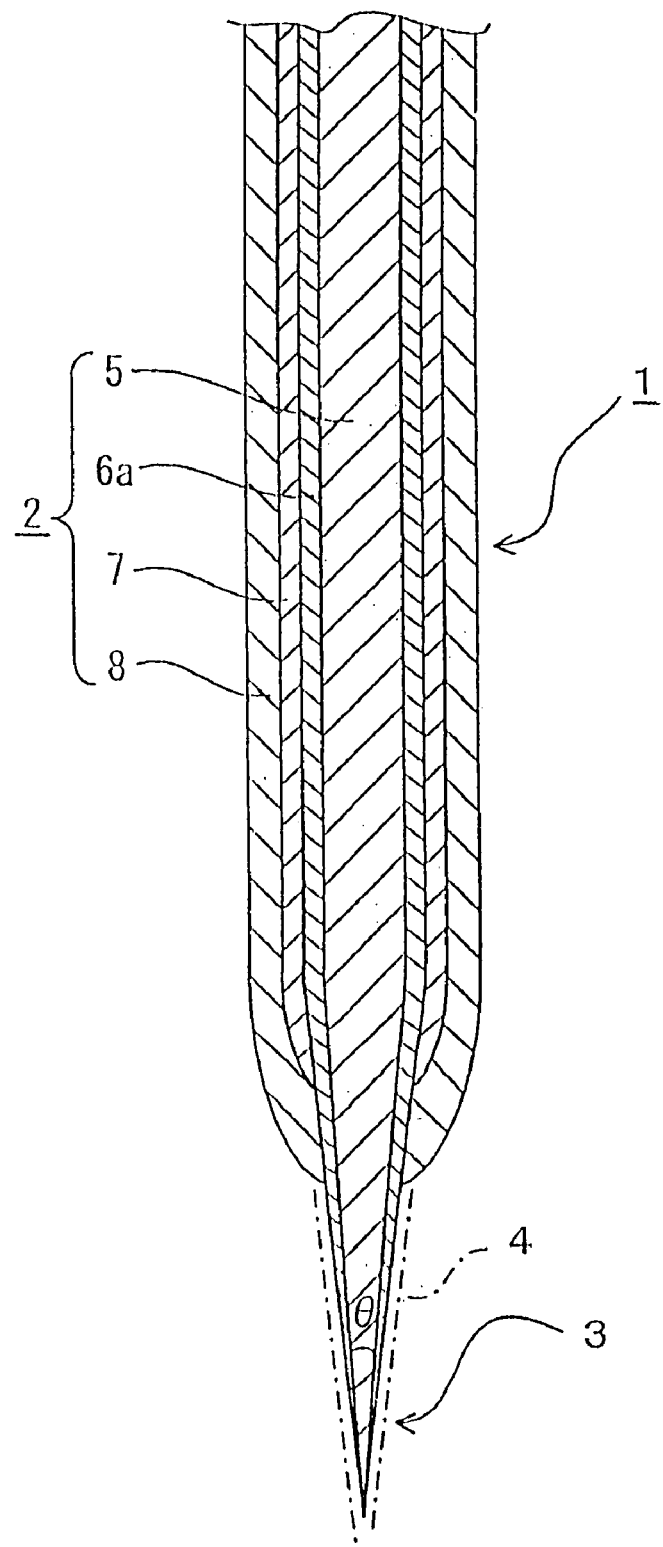
FIG. 9 is a cross-sectional view, cut in the longitudinal direction, of the optical fiber probe of the present invention.

FIG. 9 is a cross-sectional view, cut in the longitudinal direction, of the optical fiber probe of the present invention, where the sections common to those shown in FIGS. 1 to 3 are marked with the same symbols.

Referring to FIG. 9, an optical fiber probe 1 of the present invention had the optical fiber 2 whose end was processed to have a sharpened section 3, which was coated with a light-shielding metallic film 4, represented by the broken line with a dot in-between. The sharpened section 3 was slanted at an angle (θ) of around 20 to 150°.

The optical fiber described earlier for transmitting ultraviolet ray was used as the optical fiber 2. The optical fiber of the above-described structure, when used as the probe for a scanning near field optical microscope, can propagate deep ultraviolet and vacuum ultraviolet ray at a high transmittance, control deterioration by ultraviolet ray with which it is irradiated, and hence provide the optical fiber probe serviceable stably for extended periods.

Incidentally, the optical fiber probe of the above structure is applicable to an exposure device which uses an excimer laser and surface cleaning device which uses an excimer lamp, both using deep ultraviolet or vacuum ultraviolet ray.

Next, the method of sharpening the end of the optical fiber 2 of the above structure is described.

Figure 10:
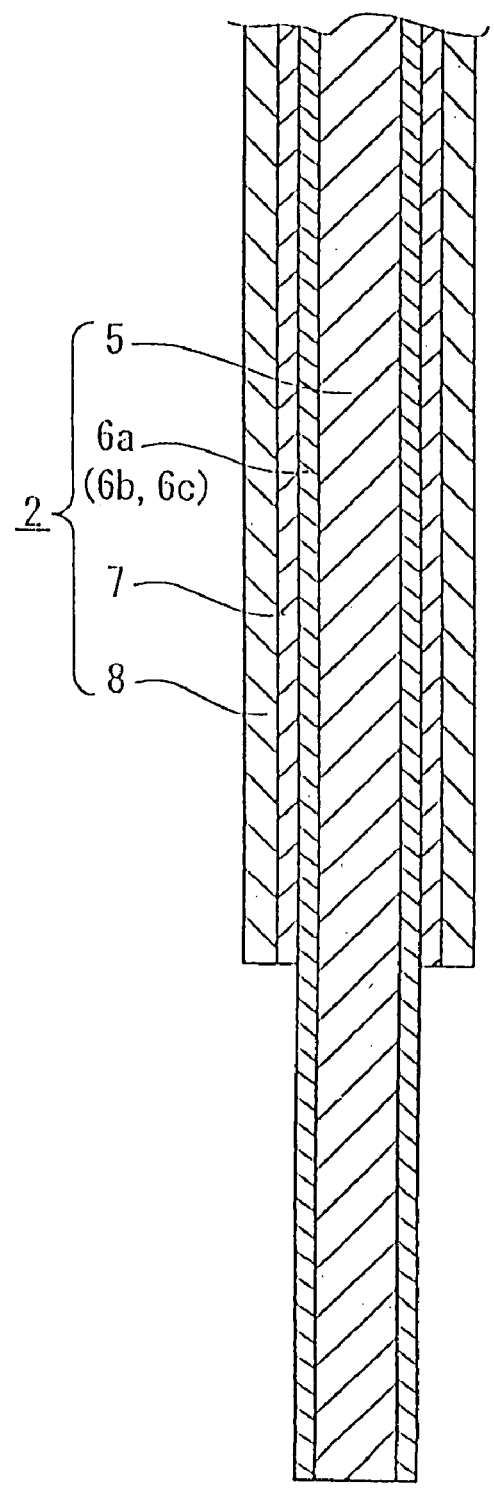
FIG. 10 is a cross-sectional view, cut in the longitudinal direction, showing the treated conditions of the end of the optical fiber of the present invention.
Figure 11:
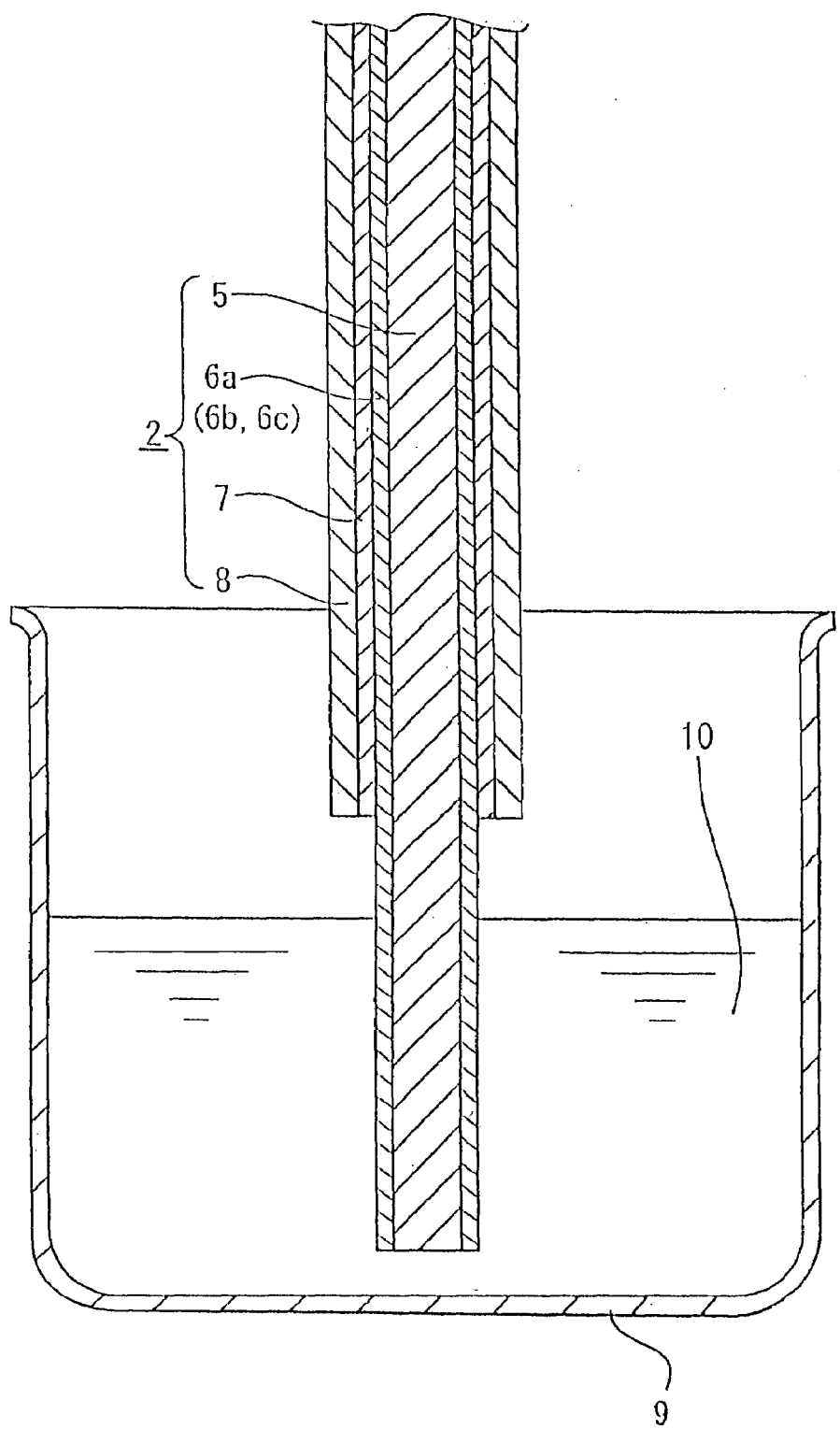
FIG. 11 shows the etching conditions for the optical fiber of the present invention.

First, referring to FIG. 10, the given section of the optical fiber 2 is cut in the direction perpendicular to the optical axis, and the covered layer for protection 8 and protective layer 7 of given length from the cut section end are separated, to clean the external surfaces of the clads 6a, 6b and 6c. Next, referring to FIG. 11, the end section of the optical fiber 2 (shown in FIG. 10) is immersed for a given time in an aqueous solution of hydrofluoric acid 10, held in a container 9. Concentration of the aqueous solution is set at 2 to 46%, because the solution may not efficiently etch the optical fiber end at below 2%, whereas it may roughen the external surface of the core 5 at above 46%.

When immersed in the solution for around 120 minutes, the optical fiber end is treated to have the sharpened section 3 end slanted at a sharpened angle (θ) of around 20 to 150° as shwon in FIG. 9. The optical fiber surface, except for the light-transmitting section of the sharpened section 3, is provided with the light-shielding metallic coating film 4 (shown in FIG. 9) by vacuum evaporation, sputtering or the like, to produce the optical fiber probe of the present invention.

EXAMPLE 2

In the Example, a fluorine-doped silica glass (a trade name: AOX made by Asahi Glass Company) containing fluorine at 100 to 200 ppm and OH group at 4 to 7 ppm was used for the core 5, and silica glass containing fluorine at 2,000 ppm was used for the clad 6a formed over the core 5. The core and clad were produced to have a diameter of 10 and 125 $\mu$m, respectively. In COMPARATIVE EXAMPLE, the optical fiber composed of the 10 $\mu$m-diameter core of silica glass and 125 $\mu$m-diameter clad of silica glass was prepared. The end of each of these optical fibers was cut in the direction perpendicular to the optical axis, and the covered layer for protection 8 and protective layer 7 of given length (around 1 cm) from the cut section end were separated, to clean the external surfaces of the clad 6a. Next, the end section of each of these fibers of the EXAMPLE and COMPARATIVE EXAMPLE was immersed in a 30% aqueous solution of hydrofluoric acid 10, held in the container 9, to etch the section. The results are given in FIG. 12.

Figure 12:
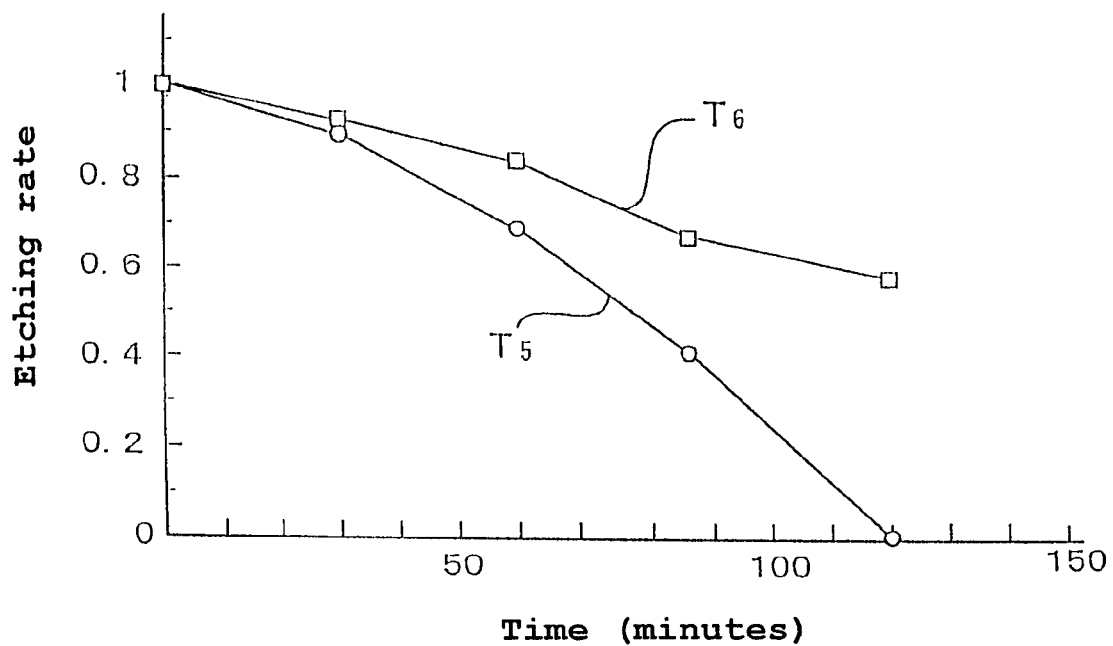
FIG. 12 compares etching rate of the optical fiber of the present invention, prepared in EXAMPLE, with that of the optical fiber prepared in COMPARATIVE EXAMPLE.
Figure 13:
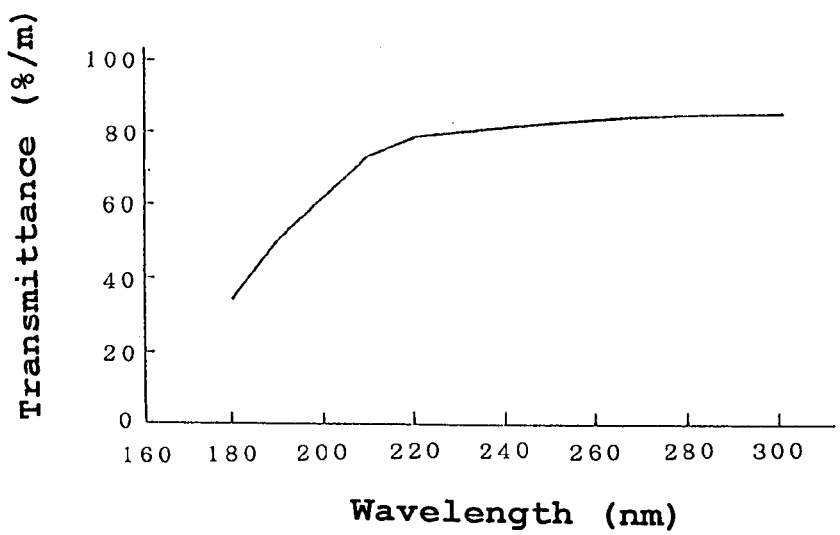
FIG. 13 shows the characteristics of the conventional optical fiber.
Figure 14:
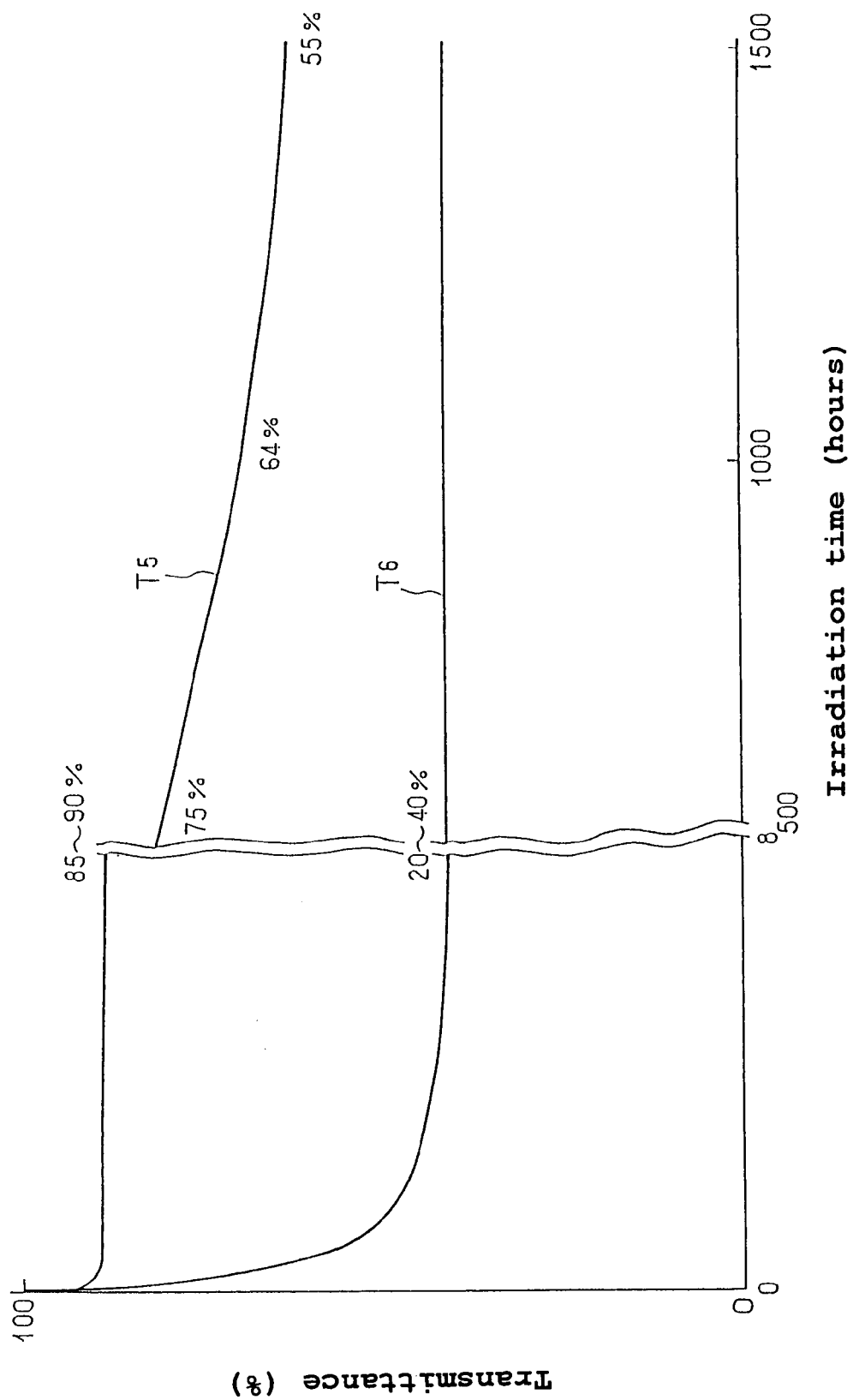
FIG. 14 also shows the characteristics of the conventional optical fiber.

As shown in FIG. 12, the optical fiber T5 prepared in EXAMPLE 2 was etched almost completely in around 120 minutes, whereas the optical fiber T6 prepared in the COMPARATIVE EXAMPLE was etched only to 40% or so in the same period.

Incidentally, the optical fiber end was sharpened with the etchant solution in EXAMPLE 2. However, the sharpening method for the present invention is not limited to the above. For example, it may be sharpened by machining or gas-aided etching. The optical fiber diameter is not limited, and the one having a diameter of 20 $\mu$m to 2 mm may be used for the probe.

INDUSTRIAL APPLICABILITY

As described above, the optical fiber of the present invention for transmitting ultraviolet ray has a high transmittance for deep ultraviolet and vacuum ultraviolet ray and is resistant to deterioration by ultraviolet ray when irradiated therewith, because it is produced to have the core of silica glass containing a given content of fluorine, and clad of silica glass containing a given content of fluorine or boron, of resin which transmits ultraviolet ray, or with two or more air holes. In particular, the hydrogen-treated optical fiber for transmitting ultraviolet ray has much improved characteristics. Therefore, it can be suitably used for, e.g., an exposure device which uses an excimer laser and surface cleaning device which uses an excimer lamp, and can reduce their sizes.

The optical fiber probe of the present invention can transmit deep ultraviolet and vacuum ultraviolet ray at a high transmittance, is resistant to deterioration by deep ultraviolet and vacuum ultraviolet ray when irradiated therewith, and stably serviceable for extended periods, because its optical fiber has, e.g., the core of silica glass containing a given content of fluorine and clad of silica glass containing a given content of fluorine or boron over the core.

Moreover, the optical fiber can be etched more efficiently by the method of the present invention for producing the optical fiber probe than the conventional one provided with the core of germanium-containing silica glass, because it has the fluorine-containing core and clad, and etched with an aqueous solution of hydrofluoric acid as the etchant solution. Therefore, the method of the present invention for producing the optical fiber probe can sharpen the optical fiber end to a desired shape.

What is claimed is:

1. An optical fiber for transmitting ultraviolet rays, comprising a core of silica glass impregnated with hydrogen and containing 100 to 1,000 ppm fluorine and 4 to 7 ppm hydroxyl groups.

2. The optical fiber for transmitting ultraviolet rays according to claim 1, wherein said optical fiber further comprises a cladding of silica glass containing 1,000 to 7,000 ppm fluorine or 2,000 to 10,000 ppm boron.

3. The optical fiber for transmitting ultraviolet rays according to claim 1, wherein said optical fiber further comprises a cladding of resin which transmits ultraviolet rays.

4. The optical fiber for transmitting ultraviolet rays according to claim 1, wherein said optical fiber further comprises a cladding having two or more air holes arranged in parallel to the optical axis.

5. The optical fiber for transmitting ultraviolet rays according to claim 1, wherein said cladding is coated with a protective layer.

6. The optical fiber for transmitting ultraviolet rays according to claim 1, wherein said protective layer is coated with a covering layer for protection.

7. A method of producing an optical fiber for transmitting ultraviolet rays, comprising drawing an optical fiber having a core of silica glass containing 100 to 1,000 ppm fluorine and 4 to 7 ppm hydroxyl groups and then impregnating the drawn optical fiber with hydrogen.

8. The method of producing an optical fiber for transmitting ultraviolet rays ray according to claim 7 further comprising arranging capillaries, each having a central lumen, on the core, coating the core with the capillaries to integrate them with each other, then subjecting the capillary-coated core to said drawing.

9. The method of producing an optical fiber for transmitting ultraviolet rays according to claim 7, further comprising:

forming a cladding on said core; and
   coating said cladding with a covering layer for protection during said drawing.

10. The method of producing an optical fiber for transmitting ultraviolet rays according to claim 9, wherein said coating with the covering layer for protection is conducted after the hydrogen impregnation treatment.

11. An optical fiber probe having an optical fiber sharpened at the end, characterized in that the optical fiber comprises a core of silica glass containing 100 to 1,000 ppm fluorine.

12. The optical fiber probe according to claim 11, wherein said optical fiber further comprises a cladding of silica glass containing 1,000 to 7,000 ppm fluorine or 2,000 to 10,000 ppm boron.

13. The optical fiber probe according to claim 11, wherein said core is coated with a cladding of resin which transmits ultraviolet rays.

14. The optical fiber probe according to claim 11, wherein said core is coated with a cladding having two or more air holes arranged in parallel to the optical axis.

15. The optical fiber probe according to claim 12, wherein said cladding is coated with a protective layer.

16. The optical fiber probe according to claim 15, wherein said protective layer is further coated with a covering layer for protection.

17. A method of producing the optical fiber probe of claim 11, wherein said optical fiber end is sharpened with an etchant solution.

18. The method of producing the optical fiber probe according to claim 17, wherein said etchant solution is a 2 to 46% aqueous solution of hydrofluoric acid.

* * * * *

UNITED STATES PATENT AND TRADEMARK OFFICE
CERTIFICATE OF CORRECTION

PATENT NO. : 6,944,380 B1
APPLICATION NO. : 10/399967
DATED : September 13, 2005
INVENTOR(S) : Hosono et al.

It is certified that error appears in the above-identified patent and that said Letters Patent is hereby corrected as shown below:

On the Title of the patent Item [73]:

"Assignee:   Japan Science and Technology Agency (JP)"

Should read:

-- Assignees:   Japan Science and Technology Agency (JP);
Showa Electric Wire & Cable Co., Ltd. (JP); and
Asahi Glass Co., Ltd . (JP) --

Signed and Sealed this

Fifth Day of February, 2008

JON W. DUDAS
*Director of the United States Patent and Trademark Office*